Figure 1:
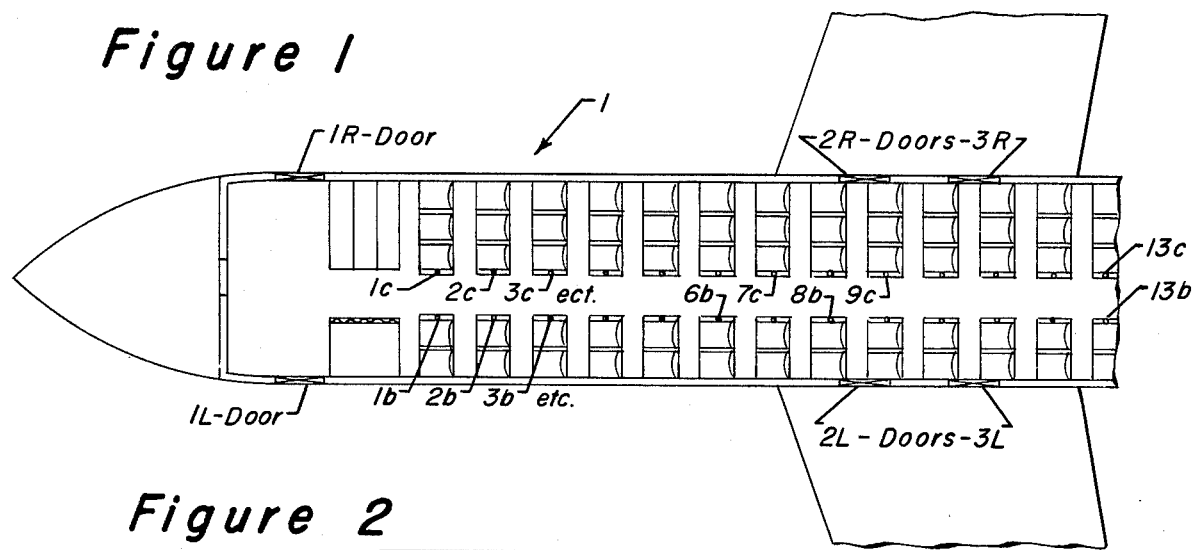

United States Patent [19]

Iwans

[11] 4,029,994

[45] June 14, 1977

[54] EMERGENCY FLASHING LIGHT SYSTEM FOR INDICATING EXITS OF PASSENGER CARRIERS

[75] Inventor: Robert C. Iwans, Hartford, Conn.

[73] Assignee: UOP Inc., Des Plaines, Ill.

[22] Filed: Jan. 5, 1976

[21] Appl. No.: 647,276

[52] U.S. Cl. .................................. 315/323; 315/84; 315/132; 315/313; 340/27 R; 340/274 R; 340/275; 340/331

[51] Int. Cl.[2] .......................................... H05B 37/02

[58] Field of Search .............. 315/200 A, 312, 313, 315/323, 324, 362, 129–132; 340/25, 27 R, 82, 109, 274 R, 275, 331, 341

[56] References Cited

UNITED STATES PATENTS

| | | | |
|---|---|---|---|
| 3,411,131 | 11/1968 | Hewes | 340/25 X |
| 3,428,941 | 2/1969 | Hewes | 340/27 R |
| 3,458,759 | 7/1969 | Chase | 315/312 |
| 3,935,561 | 1/1976 | Bruner | 340/331 X |

*Primary Examiner*—Eugene La Roche
*Attorney, Agent, or Firm*—James R. Hoatson, Jr.; Philip T. Liggett; William H. Page II

[57] ABSTRACT

An emergency light system which incorporates flashing strobe type of lights located along the aisle(s) of an aircraft, or other passenger carrier, would provide flashing arrows indicating the location of emergency exits. The sequential firing of the flashing lamps will further create the effect of a moving light beam to lead passengers toward the exit area(s). Also, with programmable control means, there can be stroboscopic type flashing lights to direct egress to only those exits which are open.

4 Claims, 4 Drawing Figures

EMERGENCY FLASHING LIGHT SYSTEM FOR INDICATING EXITS OF PASSENGER CARRIERS

The present invention relates to an emergency light system which will indicate the direction to emergency exits of an airplane or other passenger carrier.

More particularly, the present invention is directed to a flashing light system which incorporates battery powered electronic flash lamps located along the aisle(s) of the carrier and control means to provide a stroboscopic sequential firing of the lamps that can create the illusion of a moving light beam to lead passengers toward the proper exit areas.

In an aircraft the lights could be shaped as small arrows and be placed in the armrests along the aisles of the plane or, alternatively, they could be spaced along the edge of the overhead luggage racks such that they will be easily seen by everyone from the entire interior of the carrier, as well as from the aisle areas. Actually, the present system could well be used on trains, passenger ships, hydrofoil craft, etc., and need not be limited to being installed on aircraft.

It is, of course, a well-known procedure to have stationary "exit" lights over or adjacent to all doors of a public gathering place and for all exit doors of a common carrier. It is also known to use flashing neon lighting, or even flashing incandescent light bulbs, to point out a direction to an entrance or exit area for a building. However, there are no presently known usages of emergency flashing light systems in connection with assisting the quick and orderly removel of passengers from an airplane or large passenger carrier, particularly with stroboscopic type of light systems in the suggested locations to help direct egress from a carrier.

In connection with an airplane crash of any type, there is a high probability of fire and resulting smoke which will fill the cabin areas such that it is extremely desirable to provide an emergency lighting system that will assist people in a smoke-filled zone. It is believed that the electronic flashing, or strobe light effect, as provided by the present invention, will be of particular advantage where smoke is present and would block out conventional exit lights.

It may also be considered an object of the present invention to provide a system which can be independently battery powered so as not to depend upon a vehicle battery or generator system.

A further object of the invention is to be able to have sequential firing of electronic flash units such that there may be the heretofore described illusion of a light beam leading one to an appropriate exit.

As a still further object of the invention, there can be incorporated suitable programmable control means and memory means to regulate an output driver means which will connect to all of the strobe lights of the craft to provide for flashing arrows and resulting beam effects which will direct egress to only the exits which are open or usable.

In a broad aspect, the present invention provides an emergency stroboscopic type of lighting system for directing passengers to an appropriate exit of a large passenger carrier, which comprises in combination, (a) a strobe system including a plurality of electronic flash lamps which are maintained in spaced positions along the length of the passenger area of the carrier; (b) battery power supply means and high voltage-capacitive-trigger discharge means for each of the electronic flash lamps of the system, (c) an output driver means with switching means to connect to the trigger discharge means for operating said flash lamps, (d) a time-base generator means connecting to a logic controller means and the latter in turn connecting to said output driver means to provide for the timing and switching thereof and the sequential firing of said plurality of electronic flash lamps in a manner whereby such sequential firing will create the effect of a moving light beam that will indicate a direction of egress from said carrier.

It is not intended to limit the present invention to any one type of electronic flash lamp nor to any one specific type of strobe circuitry in effecting the present exit lighting system. Typically, the flashing light will be of a gas discharge type using xenon gas, although the lights or tubes could be of neon glow lamp type of construction or any high intensity, rapid fire, recovery lamp system with appropriate electronic power supply. The gas discharge type of tube or lamp is of advantage in being able to produce greater intensity and is capable of producing flashing of several hundred thousand candlepower with a duration of but a few thousandths of a second. There may also be flash lighting from a spark gap type of lamp. The light duration from a xenon lamp or from a spark gap type of tube is, of course, influenced by the electrical characteristics of the capacitor means connected to the lamp, the resistance of the leads, and the nature of other components in the system.

In a simplified embodiment of the present invention, as heretofore set forth, the plurality of spaced electronic flash lamps will be connected in a strobe system which will be provided with switching to give sequential firing of the lamps to create an illusion of directing a light beam to a particular zone. However, as also heretofore indicated, the preferred embodiment of the emergency lighting system will include a programmable controller means which is connected to all of the exit doors such that it can operate responsive to receiving suitable signals from each of the doors, or act responsive to receiving no signal from a particular door, to in turn operate the driver means to provide for sequentially firing the spaced electronic flash lamps in a manner that will have them indicate directions to only those doors which are usable for exit from the carrier.

Thus, while a simplified electronic circuitry arrangement would provide merely the oscillator means or the time-base generator means, the logic or control means and driver means to connect with the plurality of tubes of the strobe system and effect the desired sequential, stroboscopic type of firing for the plurality of lamps, the more elaborate type of system will include programming means in combination with the controller, such that by having a switching means or other suitable signal means from each of the plurality of doors to provide an indication of usability, or of non-usability, then the programmable controller can, in turn, provide a suitable programmed system of firing to the output driver means such that suitable firings of the plurality of lamps will give a desired directional indication from the resulting lighting.

Reference to the accompanying drawing and the following description thereof will serve to illustrate a present invention, as well as assist in setting forth the advantages which can be obtained from having this type of emergency lighting within a large passenger carrier.

FIG. 1 of the drawing is a diagrammatic plan view of a portion of an aircraft to indicate a typical seating arrangement and exit door arrangement, as well as provide an indication that lights are placed in the seat armrests which are along the aisle of the craft.

Figure 2:
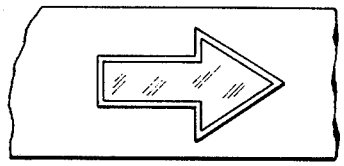

FIG. 2 of the drawing indicates diagrammatically that each individual flashing light could incorporate a transparent or translucent cover plate which would provide that each light is of an arrow configuration.

Figure 3:
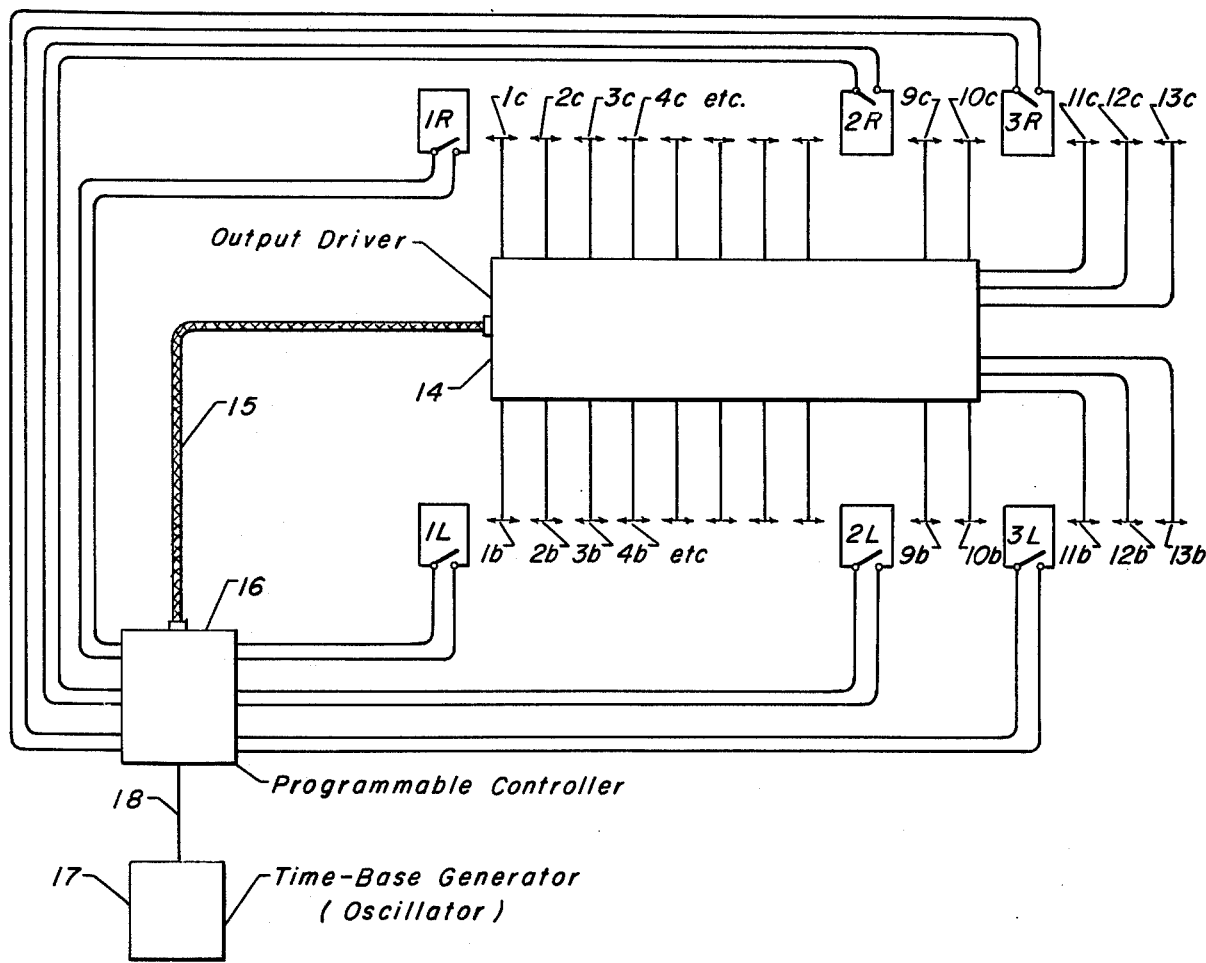

FIG. 3 provided a diagrammatic circuitry arrangement where a programmable controller means is used in combination with an output driver means to connect with each of the plurality of electronic flashing lamps such that there may be the rapid sequential firing of the plurality of lamps to indicate exit directions from within the carrier. The circuitry also indicates that the programmable controller is connected with the various doors of the carrier such that suitable signals may be sent to the output driver to be responsive to the availability of all of the exit doors, or the usability of only a portion of the doors.

Referring now particularly to FIG. 1 of the drawing, there is indicated diagrammatically a portion of an aircraft 1 which has two forward doors 1R and 1L, as well as four emergency exit doors over the wing areas such as 2R, 3R, 2L and 3L. There is also diagrammatically indicated the placement of a plurality of emergency strobe type lights along the aisle of the aircraft, with a light being placed in each seat armrest that is adjacent the aisle for each seating row throughout the full length of the aircraft. These lights are indicated as being 1b, 2b, 3b, etc., on through 13b, on one side of the aisle while the plurality of lamps on the other side of the aisle are indicated as 1c through 13c.

As heretofore noted, these lamps are of an electronic flash type, such as xenon-filled flash lamps, capable of providing rapid sequential firing. Although it is not required to have any particular shape for the exposed portion of the flashing lamp, gas tube, or whatever, the preferred construction may be as shown in FIG. 2 of the drawing, where the exposed translucent portion of the lamp is of an arrow configuration to assist in pointing to a particular direction. Also, inasmuch as the emergency flashing light system of the present invention may well be used in a smoke-filled cabin because of burning within or around the aircraft, it may be advisable to use a lens material for each lamp that would assist in providing light rays which will more readily penetrate smoke that may be present in the cabin. For example, a yellow lens for each of the lamps may be of advantage over clear white in providing greater visibility in hazy or smoked-filled areas. In any event, it is not intended to limit the present invention to the use of any one type of electronic flash lamp or to any one color effect from the lamp. Also, as heretofore noted, the flashing strobe lamps can be in armrest or along the exterior edge of an overhead hat and coat rack or overhead compartment.

In a simplified, unprogrammed type of lighting system, the firing of the lamps in the arrangement of FIG. 1 could be such that the lights mounted in or above the forward seating groups, i.e. 1c through 5c and 1b through 5b, would provide flashing in a sequential manner so as to indicate a light beam leading passengers forward to the front doors 1R and 1L. At the same time, the sequence of flashing lamps at seats 6b through 9b and lamps in the seating groups 6c through 9c would indicate an exit direction toward doors 2R and 2L, while in a similar manner the flashing lights for seats 10b through 13b, etc., and 10c through 13c, etc., would indicate an egress direction toward doors 3R and 3L.

On the other hand, where certain of the doors may be jammed or damaged, a preferred programmable system would provide for a different sequence of lighting for various of the flashing lamps in order to indicate egress directions to doors other than towards those that are blocked or damaged. Thus, where the system is provided to be responsive to only those doors that are openable and usable, there is necessarily the inclusion of additional door switching, or suitable indicator means, provided from each door of the carrier that will be connective to the controller means such that the latter can, in turn, provide a suitable programmed firing arrangement to regulate the output driver means and the sequential firing of the plurality of lamps.

In FIG. 3 of the drawing, there is indicated a plurality of lamps in two different rows, such as lamps 1b through 13b in one row and lamps 1c through 13c in the other row so as to correspond to the general arrangement of FIG. 1 of the drawing except that the lamps can be in armrests or in combination with the overhead storage means for "carry-on" luggage, hats, coats, etc. There are also shown three doors, namely 1R, 2R and 3R at one side of the aircraft and doors 1L, 2L, and 3L for the other side of the aircraft, so as to again be in conformity with FIG. 1 of the drawing. Each of the individual lamps of the plurality thereof is connective with an output driver means indicated at 14. The driver means will include the switching and voltage step-up means as may be necessary to effect the desired sequential firing of the plurality of lamps of the strobe system. This type of electronic equipment is readily available and known to those skilled in the electronics field so that it is not believed necessary to herein describe the equipment in detail. The output driver means 14 is in turn connected by way of a multiple line cable 15 to a programmable controller at 16 that provides for the pulse counting and sequential operation of the multiplicity of switching means of the output driver 14 to, in turn, provide the sequential, stroboscopic effect, firing of the plurality of lamps of the strobe system. The controller 16 in the present embodiment is connected to each of the plurality of exit doors, and, in turn, is provided with built-in programming to modify the electronic flashing of the strobe system responsive to the availability of all of the doors, or to only a portion of the doors. By way of illustration, FIG. 3 of the present drawing indicates that each of the doors has a switching means connecting to the controller 16 such that it will be necessary to have a closed switch indication or an open switch indication reaching controller means 16 to regulate the particular program which will in turn be fed to the output driver means 14 to regulate the desired sequential firing of the spaced lamps. The drawing further indicates a separate oscillator or time-base generator 17 connecting through 18 to the programmable controller 16 such that suitable pulses or time-base means is provided to the system. However, it is recognized that the time-base generator may be embodied within the programmable controller 16 and form a portion thereof. Again, it may be noted that this type of electronic equipment is commercially available and it is not deemed necessary to provide any detailed description of its construction and operation, other than it will embody a design and operation to control the rate at which the strobes are fired.

In the event that all doors are available for egress, then the switching to controller 16 and the signals therefrom to the output driver 14 will, in turn, provide that the plurality of flashing lamps would indicate directional lighting to the appropriate nearest exits from the various seat locations. On the other hand, where one or more doors are not available for egress, as for example, in the event the front portion of the plane were damaged and doors 1R and 1L were not usable, then the switch signals from doors 1R and 1L would cause the programmable controller 16 to effect a different sequential operation of switching from driver 14 and a different sequential firing of lamp means in the forward part of the aircraft. Thus, the forward lamps 1b, 2b, etc., and 1c, 2c, etc., would indicate the direction of egress entirely towards the rear of the plane and to the usable more rearward doors, such as over the wings at 2R, 3R, 2L and 3L.

Again, it is to be reiterated that the present invention should not be limited to any one type of circuitry in providing the desired flashing of the exit lighting system nor to any one type of electronic flash lamp or tube. It is, however, desired that the plurality of spaced electronic flash lights be such that they are readily visible to passengers in the event of an emergency. For purposes of simplification, battery power sources have not been shown in the drawing. There may be one or more power supplying batteries for the time-base generator, the controller and the output driver means and it is not intended to limit the invention to any one system or one type of power source. In connection with the strobe lights and strobe system, there can be a battery and a part of the triggering system at each lamp location; however, it is also to be understood that the capacitive-flash trigger discharge systems and battery power means may be housed together in one general location under the floor of the carrier, or whereever may be convenient, and wires provided to lead to merely the electronic flash lamps spaced along the length of the carrier.

I claim as my invention:

1. An emergency stroboscopic type of lighting system for directing passengers to an appropriate exit of a large passenger carrier having a plurality of doors, one or more of which may be unopenable in an emergency situation, which comprises in combination,
   a. a strobe system including a plurality of electronic flash lamps which are maintained in spaced positions along the length of the passenger area of the carrier;
   b. battery power supply means and high voltage-capacitive-trigger discharge means for each of the electronic flash lamps of the system;
   c. an output driver means with switching means to connect to said flash discharge means for operating said flash lamps;
   d. a time-base generator means connecting to a logic controller means and the latter in turn connecting to said output driver means to provide for the timing and switching thereof and the sequential firing of said plurality of electronic flash lamps in a manner whereby such sequential firing will create the effect of a moving light beam that will indicate a direction of egress from said carrier; and
   e. a switch means at each door of the plurality thereof, each such switch being interconnected with said controller means, said controller means including programming means to provide a controlled sequence of firing from the driver means such that resulting lamp flashings will indicate directions to only such doors that are available for egress.

2. The lighting system of claim 1 further characterized in that each electronic flash lamp of the strobe system has high voltage-discharge means and battery power source maintained closely adjacent the zone of the flash lamp.

3. The lighting system of claim 1 further characterized in that the electronic flash lamps are positioned along each overhead luggage or hat rack area extending along the aisles of the carrier.

4. The lighting system of claim 1 further characterized in that the electronic flash lamps are housed within seat armrests along the aisle(s) of the carrier.

* * * * *